(12) United States Patent
Ali et al.

(10) Patent No.: US 11,074,056 B2
(45) Date of Patent: Jul. 27, 2021

(54) COMPUTING DEVICE MONITORINGS VIA AGENT APPLICATIONS

(71) Applicant: HEWLETT-PACKARD DEVELOPMENT COMPANY, L.P., Houston, TX (US)

(72) Inventors: Valiuddin Ali, Houston, TX (US); Rick Bramley, Mansfield, MA (US); Endrigo Nadin Pinheiro, Porto Alegre (BR); Rodrigo Dias Correa, Porto Alegre (BR); Ronaldo Rod Ferreira, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/089,082

(22) PCT Filed: Jun. 29, 2017

(86) PCT No.: PCT/US2017/040013
§ 371 (c)(1),
(2) Date: Sep. 27, 2018

(87) PCT Pub. No.: WO2019/005073
PCT Pub. Date: Jan. 3, 2019

(65) Prior Publication Data
US 2020/0327235 A1 Oct. 15, 2020

(51) Int. Cl.
*G06F 8/61* (2018.01)
*G06F 11/30* (2006.01)
(Continued)

(52) U.S. Cl.
CPC .............. *G06F 8/61* (2013.01); *G06F 11/302* (2013.01); *G06F 11/324* (2013.01);
(Continued)

(58) Field of Classification Search
None
See application file for complete search history.

(56) References Cited

U.S. PATENT DOCUMENTS 8,347,348 B2  1/2013  Challener et al.
8,578,483 B2  11/2013  Seshadri et al.
(Continued)

FOREIGN PATENT DOCUMENTS

EP    2541835 A2     11/2011
WO    WO2013059870 A1  5/2013

OTHER PUBLICATIONS

"Defining a Secure Boot Policy on Dell Servers", Dell, Retrieved from Internet—http://en.community.dell.com/techcenter/extras/m/white_papers/20440707/download, 2014, 16 Pages.

*Primary Examiner* — Qing Chen
(74) *Attorney, Agent, or Firm* — HP Inc. Patent Department (57) ABSTRACT

An example computing device includes a processor, a first storage device, and a second storage device. The second storage device stores instructions to implement a firmware. The firmware is to install an agent application into the first storage device. The firmware is also to activate the agent application subsequent to installing the agent application. The firmware is further to, in response to receiving a manifest file, instruct the agent application to monitor the computing device based on the manifest file.

19 Claims, 7 Drawing Sheets

(51) Int. Cl.
*G06F 11/32* (2006.01)
*G06F 11/34* (2006.01)
*G06F 21/57* (2013.01)

(52) U.S. Cl.
CPC ........ *G06F 11/3495* (2013.01); *G06F 21/577* (2013.01); *G06F 2221/034* (2013.01)

(56) References Cited

U.S. PATENT DOCUMENTS

| | | | |
|---|---|---|---|
| 8,712,596 | B2 | 4/2014 | Scott |
| 9,038,056 | B1* | 5/2015 | Wong ........................ G06F 8/65 717/173 |
| 9,436,820 | B1 | 9/2016 | Gleichauf et al. |
| 2009/0172814 | A1* | 7/2009 | Khosravi ................ G06F 21/51 726/23 |
| 2010/0050244 | A1 | 2/2010 | Tarkhanyan et al. |
| 2011/0099255 | A1* | 4/2011 | Srinivasan ............. H04L 63/20 709/221 |
| 2011/0099547 | A1 | 4/2011 | Banga |
| 2011/0161452 | A1 | 6/2011 | Poornachandran et al. |
| 2011/0231668 | A1* | 9/2011 | Schluessler ............ G06F 21/54 713/187 |
| 2012/0254993 | A1 | 10/2012 | Sallam |
| 2012/0255021 | A1 | 10/2012 | Sallam |
| 2013/0086669 | A1* | 4/2013 | Sondhi ............. H04W 12/0608 726/8 |
| 2013/0174214 | A1* | 7/2013 | Duncan ............... G06F 11/3065 726/1 |
| 2015/0040224 | A1 | 2/2015 | Litva et al. |
| 2015/0067665 | A1* | 3/2015 | Thomas .................... G06F 8/65 717/168 |
| 2015/0341447 | A1* | 11/2015 | Patil .................... H04L 67/1044 370/329 |
| 2016/0094936 | A1* | 3/2016 | Yang ...................... G06F 1/163 455/456.1 |
| 2017/0193584 | A1* | 7/2017 | Narasimhan ....... G06Q 30/0631 |
| 2017/0353497 | A1* | 12/2017 | Bradley ................ H04L 67/125 |
| 2018/0234430 | A1* | 8/2018 | Walstad ............... H04L 63/0815 |

* cited by examiner

COMPUTING DEVICE MONITORINGS VIA AGENT APPLICATIONS

BACKGROUND

Nowadays computing devices face a varieties of threats, such as computer virus, unauthorized access, etc. To protect the computing devices against the threats, information technology (IT) administrators may employ different tools. For example, the tools may include anti-virus applications, firewalls, and software updates.

BRIEF DESCRIPTION OF THE DRAWINGS

Some examples of the present application are described with respect to the following figures.

DETAILED DESCRIPTION

Besides facing the challenge of protecting against external threats, such as computer viruses, IT administrators also face the challenge of ensuring computing devices comply with an organization's security policy. In some instances, a computing device may be non-compliant with the security policy due to a user's action, intentionally or unintentionally. For example, the user may turn off an anti-virus application unintentionally. When a non-compliance event is not caused by an external threat, there is a need to remediate the non-compliance event quickly.

Examples described herein provide an approach to enforce security policies on computing devices and remediate non-compliance events. For example, a computing device may include a processor, a first storage device, and a second storage device. The second storage device may store instructions to implement a firmware. The firmware may install an agent application into the first storage device. The firmware may also activate the agent application subsequent to installing the agent application. The firmware further may, in response to receiving a manifest file, instruct the agent application to monitor the computing device based on the manifest file.

In another example, a non-transitory computer-readable storage medium may include instructions that when executed cause a processor of a computing device to: install an agent application into a first storage device of the computing device from a firmware of the computing device; in response to receiving a request from the agent application, transmit an authorization value to the agent application to establish a secured protocol; in response to receiving a manifest file, instruct the agent application to monitor the computing device based on the manifest file via a first secured protocol; and receive a heartbeat message from the agent application via the secured protocol, wherein the heartbeat message indicates a presence of the agent application.

In another example, a non-transitory computer-readable storage medium may include instructions that when executed cause a processor of a computing device to: configure an agent application based on an activation message from a firmware of the computing device, where the agent application is installed from the firmware; establish a secured protocol with the firmware; in response to receiving a notification message from the firmware, monitor the computing device based on a manifest file; and in response to detecting a non-compliance event based on the manifest file, transmit a non-compliance message to an operating system of the computing device.

Figure 1:
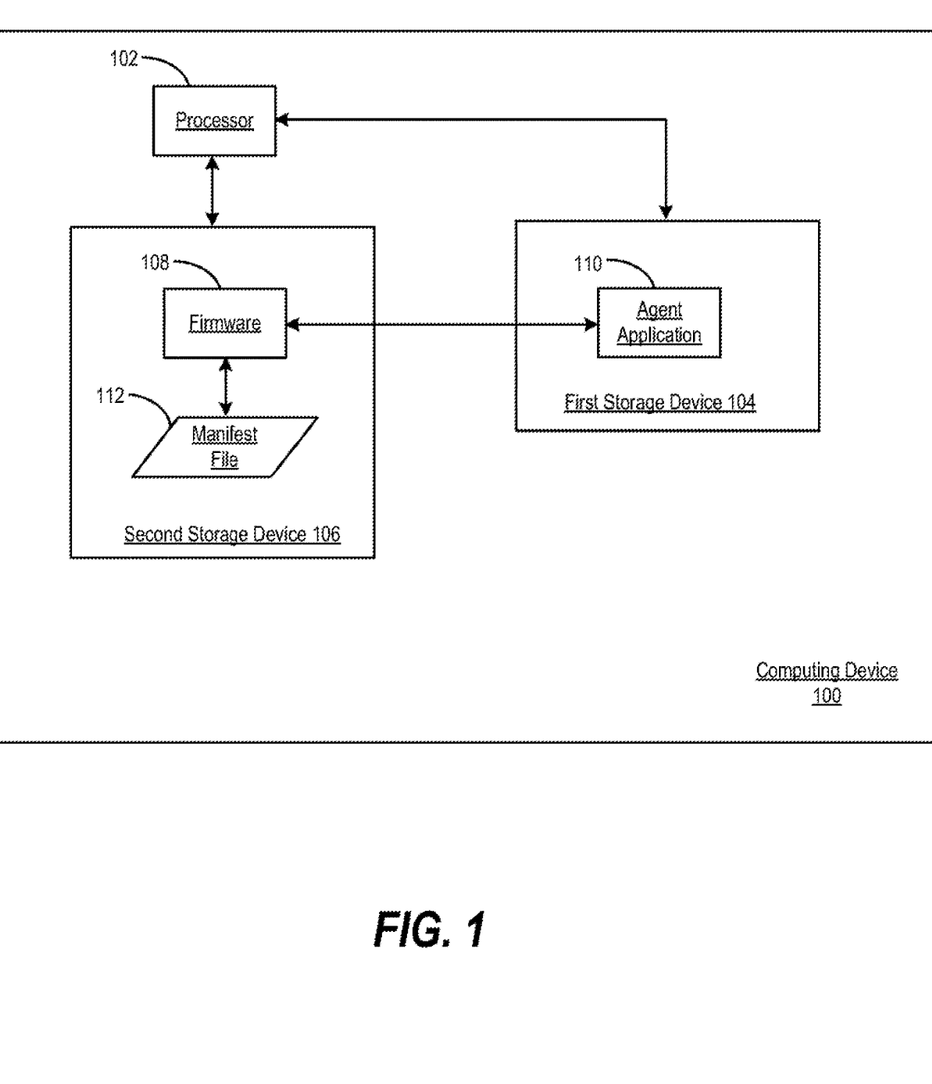
FIG. 1 illustrates a block diagram of a computing device including an agent application to monitor the computing device, according to an example.

FIG. 1 illustrates a block diagram of a computing device 100 including an agent application to monitor the computing device, according to an example. Computing device 100 may be, for example, a web-based server, a local area network server, a cloud-based server, a notebook computer, a desktop computer, an all-in-one system, a tablet computing device, a mobile phone, an electronic book reader, or any other electronic device suitable to execute an agent application to monitor computing device 100.

Computing device 100 may include a processor 102, a first storage device 104, and a second storage device 106. Processor 102 may be in communication with first storage device 104 and/or second storage device 106. Processor 102 may control operations of computing device 100. Storage devices 104 and 106 may store data. In some examples, storage devices 104 and 106 may be implemented using non-volatile memory, such as hard disk drives, solid state storage, flash memory, Electrically Erasable Programmable Read-Only Memory (EEPROM), etc.

Computing device 100 may further include a firmware 108 stored in second storage device 106. Firmware 108 may control low-level operations of computing device 100, such as hardware initiations during boot up. In an example, firmware 108 may be implemented as a Basic Input/Output System (BIOS) of computing device 100. Firmware 108 may be implemented using instructions executable by processor 102.

During operation, when computing device 100 is booting up, firmware 108 may install an agent application 110 into first storage device 104 using installation data (e.g., compiled binary) of agent application 110. Subsequent to the installation, firmware 108 may activate agent application 110. In response to receiving a manifest file 112, firmware 108 may instruct agent application 110 to monitor computing device 100 based on manifest file 112.

In some examples, the installation data may also be stored in second storage device 106. In some examples, the installation data may be included as part of firmware 108. In some examples, the installation data may be stored in another device that firmware 108 may access to perform the installation.

In some examples, agent application 110 may be implemented using instructions executable by processor 102. As describe in more detail in FIG. 2, agent application 110 may monitor computing device based on manifest file 112. Manifest file 112 may be stored in second storage device 106. Computing device 100 may receive manifest file 112 from an external source, such as an IT administrator, a server, or a user of computing device 100.

Manifest file 112 may describe item(s) that agent application 110 is to monitor. Manifest file 112 may also describe a state of each item that is to be maintained during the lifecycle of the monitored item. Examples of the monitored item(s) may include:

An application (e.g., a service or a process) with the maintained state being that the application is running or executing at computing device 100, A registry entry at computing device 100 with the maintained state being the registry entry having particular value, A file with the maintained state being the existence of the file at computing device 100 and/or creation of the file in a particular date, An anti-virus application with the maintained state being the anti-virus application is active at computing device 100 and/or having a last upgrade date after a particular date, A firewall policy with the maintained state being the firewall is active at computing device 100 and/or having a last upgrade date after a particular data, or a combination thereof. Thus, when agent application 110 is to monitor computing device 100 based on manifest file 112, agent application 110 is to observe a state of each item in manifest file 112 and compare the observed state to the corresponding maintained state in manifest file 112. When the observed state is different from the maintained state, the difference is a non-compliance event.

Figure 2:
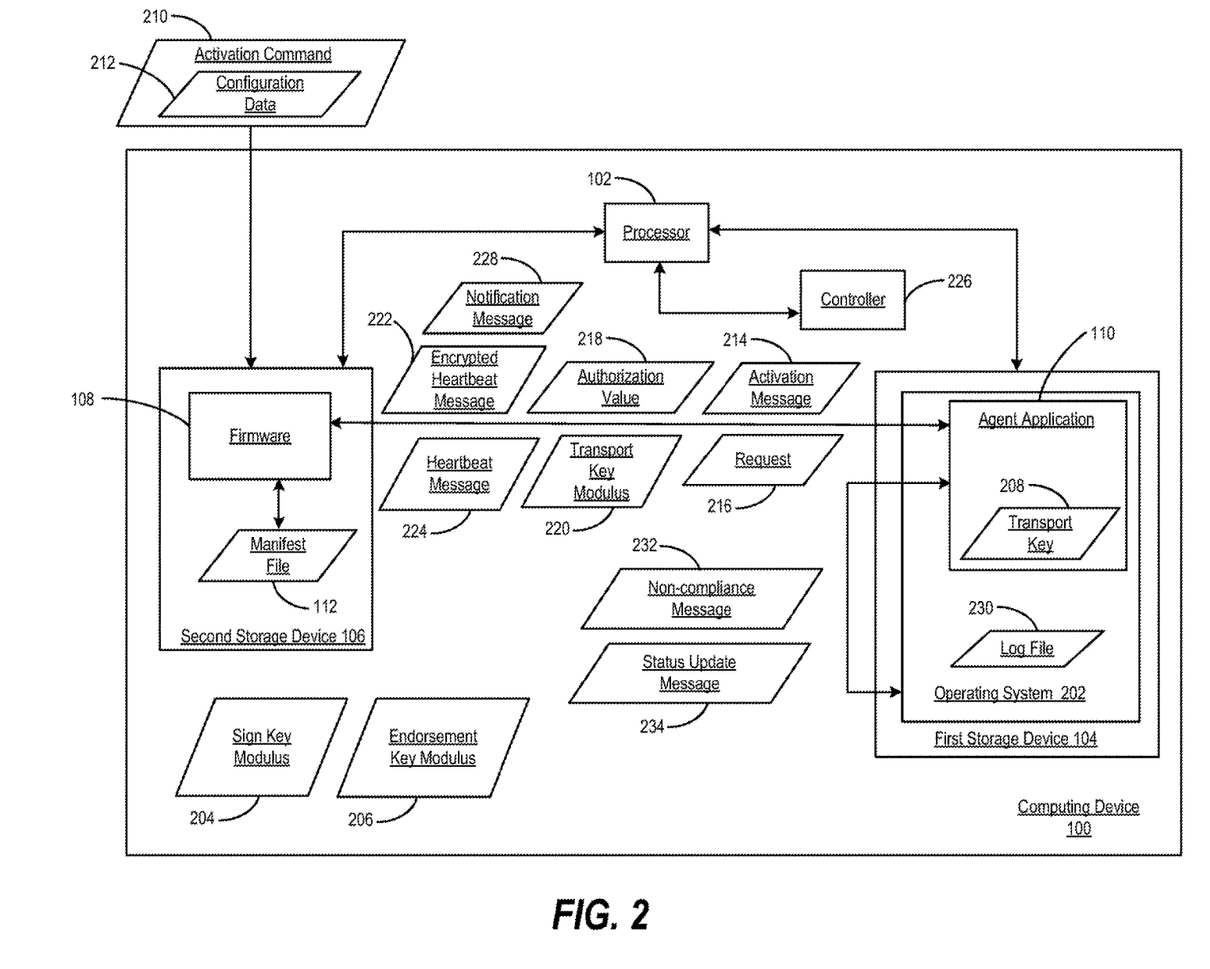
FIG. 2 illustrates a block diagram of a computing device including an agent application to monitor the computing device, according to another example.

Turning to FIG. 2. FIG. 2 illustrates a block diagram of computing device 100 including agent application 110 to monitor computing device 100, according to another example. As described in FIG. 1, firmware 108 may install agent application 110 into first storage device 104 during a boot up operation of computing device 100. In some examples, firmware 108 may install agent application 110 as a service in an operating system 202 of computing device 100.

Once agent application 110 is installed, agent application 110 may be dormant. That is, agent application 110 may not execute even when operating system 202 is executing. To enable agent application 110 to monitor computing device 100, a plurality of secured protocols may be used. As used herein, a secured protocol may mean an encryption mechanism, such as public key cryptography. For examples, three cryptography keys are used to enable agent application 110 to monitor computing device 100: a sign key (not shown), an endorsement key (not shown), and a transport key 208.

The sign key may be used to sign commands issued to firmware 108 to control agent application 110. The endorsement key may be used to sign a deactivate command sent to firmware 108 to deactivate and/or remove agent application 110 from computing device 100. Transport key 208 may be used to encrypt and decrypt heartbeat message exchanges between firmware 108 and agent application 110. Operations associated with transport key 208 and heartbeat messages are described in more detail below.

The sign key and the endorsement key may be generated locally at computing device 100 or remotely at a server. In some examples, sign key modulus 204 and endorsement key modulus 206 may be sent to firmware 108 when firmware 108 already has exponents of the sign key and the endorsement key. In some examples, sign key modulus 204 and endorsement key modulus 206 may be stored in second storage device 106. In some examples, sign key modulus 204 and endorsement key modulus 206 may be stored in another storage device of computing device 100 that firmware 108 can access. In some examples, the sign key (i.e., modulus and exponent) and the endorsement key (i.e., modulus and exponent) may be sent to firmware 108.

Firmware 108 may receive an activation command 210 that instructs firmware 108 to activate agent application 110. Activation command 210 may also include configuration data 212 of agent application 110. For example, configuration data 212 may indicate how long a heartbeat period of agent application 110 is (e.g., how frequent agent application 110 is to send a heartbeat message to firmware 108). In response to receiving activation command 210, firmware 108 may transmit an activation message 214 that includes configuration data 212 to activate agent application 110. In response to receiving activation message 214, agent application 110 may configure settings of agent application 110 based on activation message. Agent application 110 may change from dormant state to active state.

When activated, agent application 110 may begin executing in operating system 202. Agent application 110 may also transmit a request 216 to firmware 108 to request an authorization value 218. In response to receiving request 216, firmware 108 may transmit authorization value 218 to agent application 110. Agent application 110 may use authorization value 218 to generate transport key 208. Agent application 110 may use transport key 208 to enable heartbeat message exchanges between agent application 110 and firmware 108, as described in more detail below.

When agent application 110 has generated transport key 208, agent application 110 may transmit a transport key modulus 220 to firmware 108. Firmware 108 may use transport key modulus 220 and authorization value 218 to create a copy of transport key 208. Firmware 108 may encrypt a heartbeat message using transport key 208 to generate an encrypted heartbeat message 222. Firmware 108 may transmit encrypted heartbeat message 222 to agent application 110.

In response to receiving encrypted heartbeat message 222, agent application 110 may decrypt encrypted heartbeat message 222 to generate a heartbeat message 224. Agent application 110 may transmit heartbeat message 224 to firmware 108 based on the heartbeat period. Heartbeat message 224 may indicate a presence of agent application 110. Thus, when firmware 108 receives heartbeat message 224, firmware 108 may be aware that agent application 110 is executing properly and no further action is to be taken. The exchange of heartbeat messages is to be repeated periodically. In some examples, the exchange of heartbeat messages is to be repeated based on the heartbeat period.

When firmware 108 detects an absence of a particular heartbeat message from agent application 110 upon an expiration of a heartbeat period, firmware 108 may change a state of computing device 100 via processor 102 as the absence may indicate that agent application 110 has stopped executing or is not executing properly. Firmware 108 may also re-install agent application 110 upon a reboot of computing device 100. In some examples, the absence of heartbeat messages may also indicate a failed remediation of a non-compliance event, as described in more detail below.

In some examples, changing a state of computing device 100 may include: setting computing device 100 to a hibernation mode, turning off/powering off computing device 100, suspending access (e.g., locking operating system 202 via a lock screen) to computing device 100, performing an operating system recovery operation (e.g., re-install operating system 202), or a combination thereof. In some examples, when firmware 108 is to change a state of computing device 100, processor 102 may instruct a controller 226 of computing device 100 to perform the change.

When firmware 108 receives manifest file 112, firmware 108 may transmit a notification message 228 to agent application 110. Notification message 228 may instruct agent application 110 to access manifest file 112 and begin monitoring computing device 100 based on manifest file 112. Thus, based on the list of items to be monitored in manifest file 112, agent application 110 may monitor computing device 100 for any non-compliance event (i.e., any item in manifest file 112 with an observed state different from the maintained state of that item).

When agent application 110 detects a non-compliance event, agent application 110 may take actions to remediate the non-compliance event based on manifest file 112. Some examples of non-compliance event remediation may include:

Service: if a service that is supposed to be running per manifest file 112 has stopped, agent application 110 is to restart that service automatically;

Process: if a process that is supposed to be running per manifest file 112 has been closed, agent application 110 is to restart that process automatically;

Registry entry: if a registry entry is deleted or a key has its value changed as compared to the value indicated in manifest file 112, agent application 110 is to recreate the entry and/or reset the entry's value automatically;

File: if a file is modified or deleted (e.g., a configuration file), agent application 110 is to recover that file automatically;

Anti-virus application or firewall policy: if an anti-virus application or firewall that is supposed to be running is turned off or deactivated, agent application 110 is to enable that anti-virus application or firewall automatically. If the last update date is before a date indicated in manifest file 112, agent application 110 is to search for and apply the latest updates.

In some examples, when agent application 110 detects a non-compliance event, agent application 110 may record the non-compliance event in a log file 230 (e.g., Windows Event Log). In some examples, when agent application 110 fails to remediate a non-compliance event, agent application 110 may stop sending heartbeat messages to firmware 108 to indicate a non-compliance event that fails to be remediated. In some examples, when agent application 110 fails to remediate a non-compliance event, agent application 110 may send a heartbeat message (e.g., heartbeat message 224) including information about a failed remediation of a non-compliance event to firmware 108. When firmware 108 detects a failed remediation of a non-compliance event, firmware 108 may change a state of computing device 100 in a manner described above.

In some examples, when agent application 110 detects a non-compliance event, agent application 110 may transmit a non-compliance message 232 to operating system 202. Non-compliance message 232 may include information of the non-compliance event. Operating system 202 may display non-compliance message 232 to inform a user of computing device 100 of the non-compliance event. When agent application 110 has remediated the non-compliance event, agent application 110 may transmit a status update message 234 to operating system 202. Status update message 234 may include information on the remediation of the non-compliance event. Operating system 202 may display status update message 234 to inform the user that the non-compliance event has been remediated. Examples of non-compliance message 232 and status update message 234 are described in more detail in FIGS. 3A-3B.

Figure 3A:
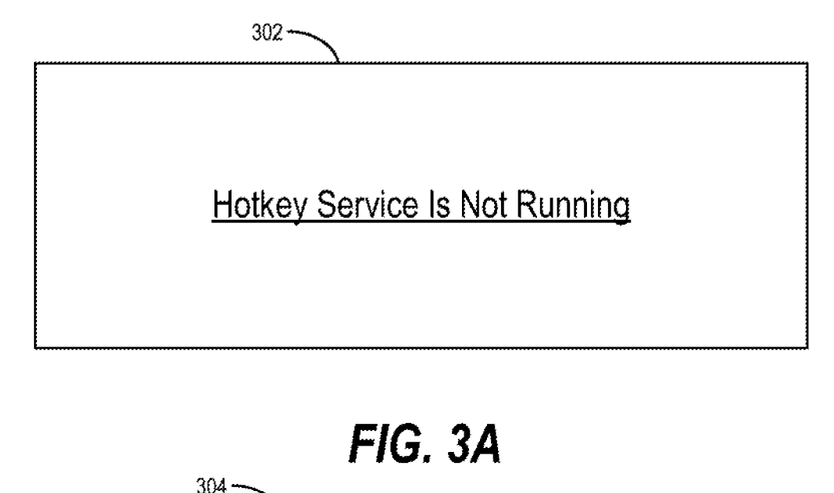
FIG. 3A illustrates a non-compliance message indicating a non-compliance event, according to an example.

FIG. 3A illustrates a non-compliance message 302 indicating a non-compliance event, according to an example. In FIG. 3A, non-compliance message 302 may indicate that a hotkey service is not running. Thus, a user may be aware that a non-compliance event has occurred and the non-compliance event is that the hotkey service has stopped running.

Figure 3B:
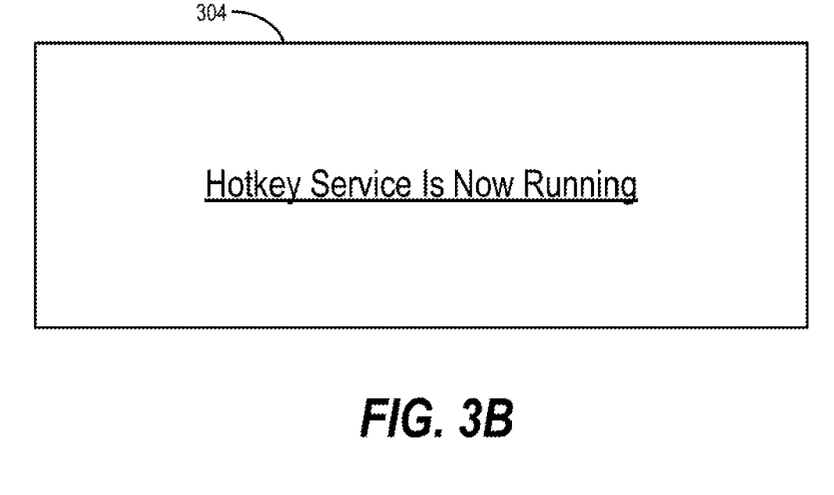
FIG. 3B illustrates a status update message indicating a remediation of a non-compliance event, according to an example.

FIG. 3B illustrates a status update message 304 indicating a remediation of a non-compliance event, according to an example. In FIG. 3B, status update message 304 may indicate that the hotkey service is now running. Thus, the user may be aware that the particular non-compliance event has been remediated.

Figure 4:
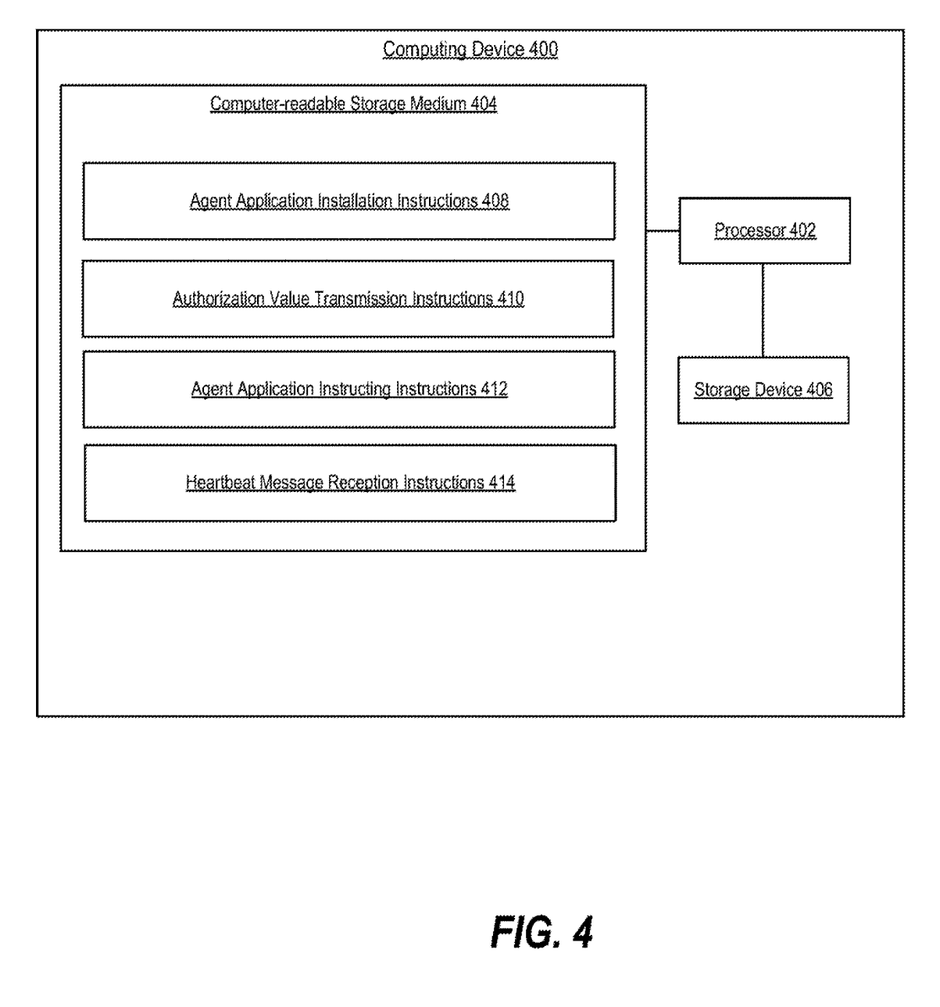
FIG. 4 illustrates a block diagram of a computing device including a firmware to control an agent application to monitor the computing device, according to another example.

FIG. 4 illustrates a block diagram of a computing device 400 including a firmware to control an agent application to monitor the computing device, according to another example. Computing device 400 may implement computing device 100 of FIGS. 1-2. Computing device 400 may include a processor 402, a computer-readable storage medium 404, and a storage device 406.

Processor 402 be a central processing unit (CPU), a semiconductor-based microprocessor, and/or other hardware devices suitable to control operations of computing device 400. Computer-readable storage medium 404 may be any electronic, magnetic, optical, or other physical storage device that contains or stores executable instructions. Thus, computer-readable storage medium 404 may be, for example, Random Access Memory (RAM), an Electrically Erasable Programmable Read-Only Memory (EEPROM), a storage device, an optical disc, etc. In some examples, computer-readable storage medium 404 may be a non-transitory storage medium, where the term "non-transitory" does not encompass transitory propagating signals. As described in detail below, computer-readable storage medium 404 may be encoded with a series of executable instructions 408-414. In some examples, computer-readable storage medium 404 may implement second storage device 406 of FIGS. 1-2. Storage device 406 may be any non-volatile memory, such as EEPROM, flash memory, etc. In some examples, storage device 406 may implement first storage device 104 of FIGS. 1-2.

Agent application installation instructions 408 may install an agent application into storage device 406 during a boot up of computing device 400. For example, referring to FIG. 1, when computing device 100 is booting up, firmware 108 may install an agent application 110 into first storage device 104 using installation data (e.g., compiled binary) of agent application 110.

Authorization value transmission instructions 410 may transmit an authorization value (e.g., a password) to the agent application. For example, referring to FIG. 2, in response to receiving request 216, firmware 108 may transmit authorization value 218 to agent application 110. Agent application instructing instructions 412 may instruct the agent application to monitor computing device 400. For example, referring to FIG. 2, when firmware 108 receives manifest file 112, firmware 108 may transmit notification message 228 to agent application 110. Notification message 228 may instruct agent application 110 to access manifest file 112 and begin monitoring computing device 100 based on manifest file 112.

Heartbeat message reception instructions 114 may receive heartbeat messages from the agent application. For example, referring to FIG. 2, when firmware 108 receives heartbeat message 224, firmware 108 may be aware that agent application 110 is executing properly and no further action is to be taken.

Figure 5:
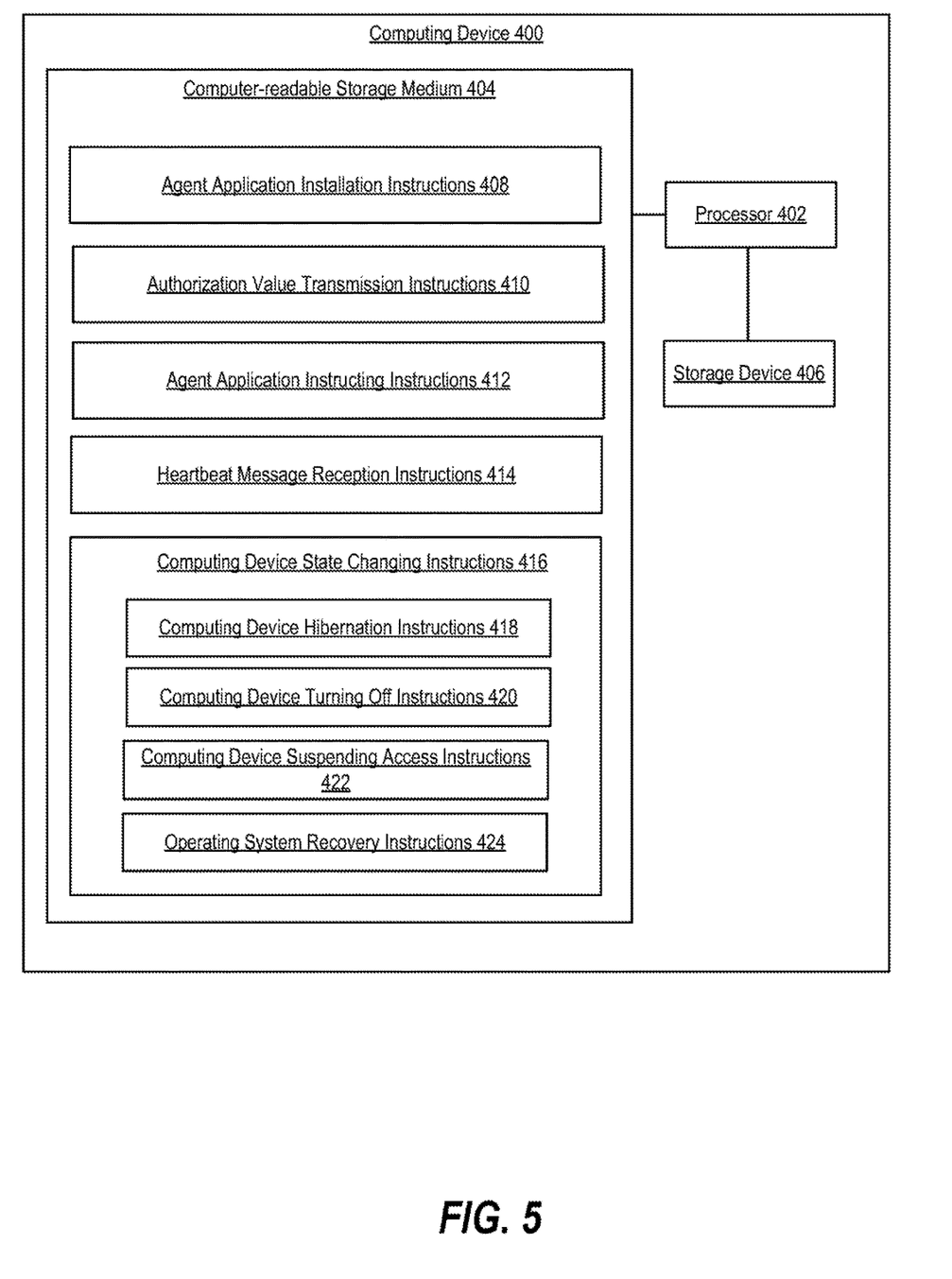
FIG. 5 illustrates a block diagram of a computing device including a firmware to control an agent application to monitor the computing device, according to another example.

FIG. 5 illustrates a block diagram of computing device 400 including a firmware to control an agent application to monitor the computing device, according to another example. As illustrated in FIG. 5, computer-readable storage medium 404 may be encoded with instructions 408-414. Computer-readable storage medium 404 may also be encoded with computing device state changing instructions 416. Computing device state changing instructions 416 may change a state of computing device 400. For example, referring to FIG. 2, when firmware 108 detects an absence of a particular heartbeat message from agent application 110 upon an expiration of a heartbeat period, firmware 108 may change a state of computing device 100 via processor 102.

In some examples, computing device state changing instructions 416 may include computing device hibernation instructions 418 that set computing device 400 to a hibernation state. Computing device state changing instructions 416 may also include computing device turning off instructions 420 that turn off/power off computing device 400. Computing device state changing instructions 416 may further include computing device suspending access instructions 422 that suspend access to computing device 400. Computing device state changing instructions 416 may further include operating system recovery instructions 424 that re-install an operating system of computing device 400. For example, referring to FIG. 2, changing a state of computing device 100 may include: setting computing device 100 to a hibernation mode, turning off/powering off computing device 100, suspending access (e.g., locking operating system 202 via a lock screen) to computing device 100, performing an operating system recovery operation (e.g., re-install operating system 202), or a combination thereof.

Figure 6:
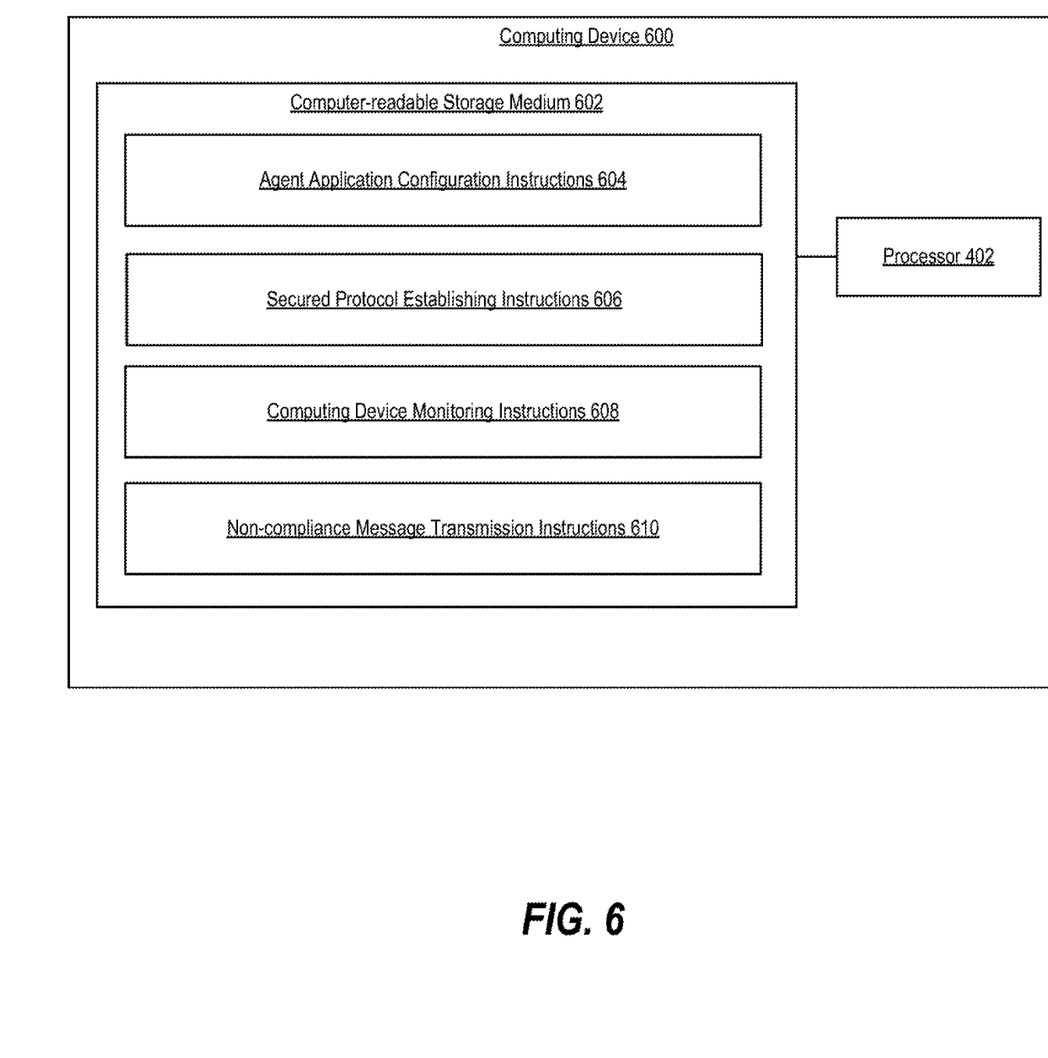
FIG. 6 illustrates a block diagram of a computing device including an agent application to monitor the computing device, according to an example.

FIG. 6 illustrates a block diagram of a computing device 600 including an agent application to monitor the computing device, according to an example. Computing device 600 may implement computing device 100 of FIGS. 1-2. Computing device 600 may include a processor 402 and a computer-readable storage medium 602. Computer-readable storage medium 602 may be similar to computer-readable storage medium 404 of FIGS. 4-5. In some examples, computer-readable storage medium 602 may implement first storage device 104 of FIGS. 1-2. Computer-readable storage medium 602 may be encoded with instructions 604-610.

Agent application configuration instructions 604 may configure settings of an agent application. For example, referring to FIG. 2, in response to receiving activation message 214, agent application 110 may configure settings of agent application 110 based on activation message 214. Secured protocol establishing instructions 606 may establish a secured protocol for communication between the agent application and a firmware of computing device 600. For example, referring to FIG. 2, in response to receiving request 216, firmware 108 may transmit authorization value 218 to agent application 110. Agent application 110 may use authorization value 218 to generate transport key 208. Agent application 110 may use transport key 208 to enable heartbeat message exchanges between agent application 110 and firmware 108.

Computing device monitoring instructions 608 may monitor computing device 600 based on a manifest file. For example referring to FIG. 2, based on the list of items to be monitored in manifest file 112, agent application 110 may monitor computing device 100 for any non-compliance event. Non-compliance message transmission instructions 610 may transmit a message to an operating system of computing device 600 to indicate a non-compliance event. For example, referring to FIG. 2, when agent application 110 detects a non-compliance event, agent application 110 may transmit a non-compliance message 232 to operating system 202. Non-compliance message 232 may include information of the non-compliance event.

Figure 7:
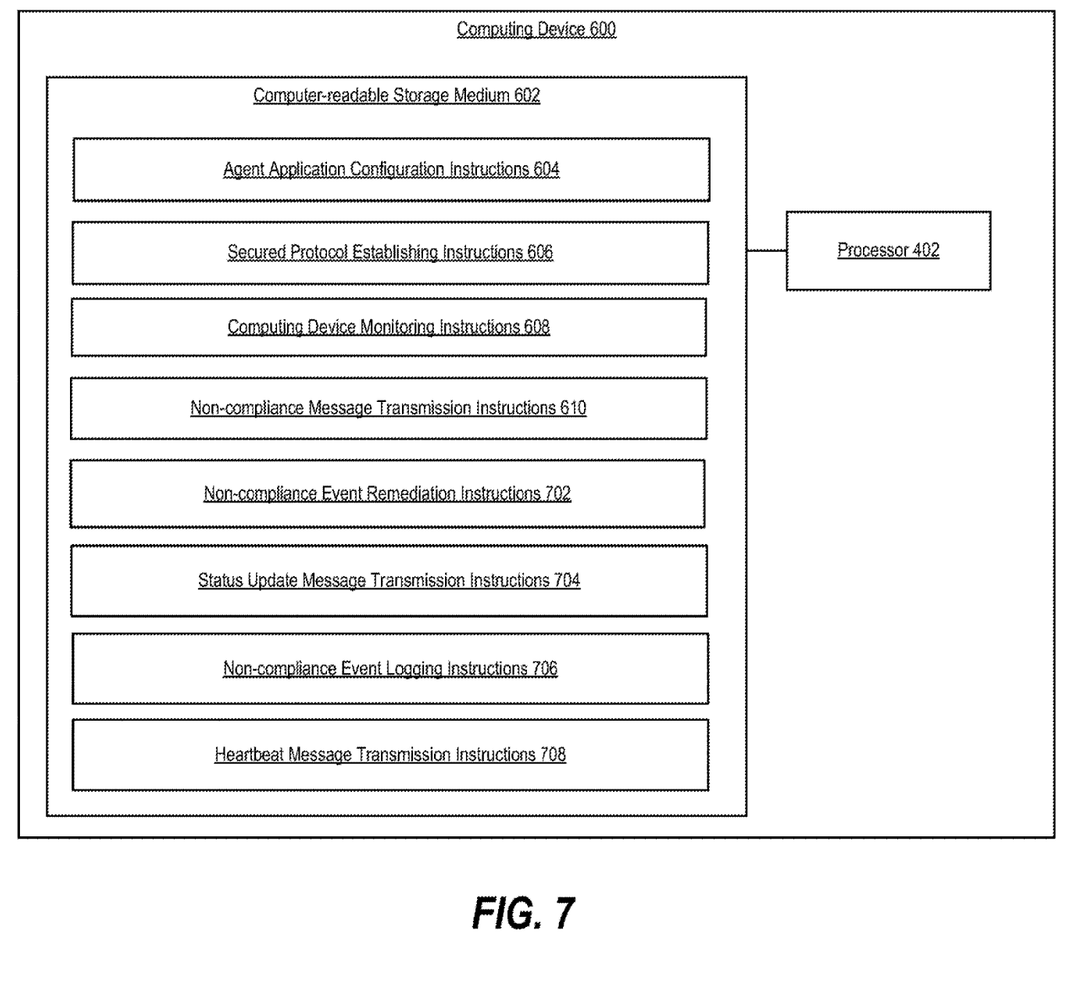
FIG. 7 illustrates a block diagram of a computing device including an agent application to monitor the computing device, according to another example.

FIG. 7 illustrates a block diagram of computing device 600 including an agent application to monitor the computing device, according to another example. As illustrated in FIG. 7, computer-readable storage medium 602 may be encoded with instructions 604-610. Computer-readable storage medium 602 may also be encoded with instructions 702-708.

Non-compliance event remediation instructions 702 may remediate a non-compliance event as detected by the agent application. For example, referring to FIG. 2, when agent application 110 detects a non-compliance event, agent application 110 may take actions to remediate the non-compliance event based on manifest file 112. Status update message transmission instructions 704 may transmit a status update message to an operating system of computing device 600 to indicate a non-compliance event has been remediated. For example, referring to FIG. 2, when agent application 110 has remediated the non-compliance event, agent application 110 may transmit a status update message 234 to operating system 202.

Non-compliance event logging instructions 706 may log a non-compliance event at a log file. For example, referring to FIG. 2, when agent application 110 detects a non-compliance event, agent application 110 may record the non-compliance event in a log file 230 (e.g., Windows Event Log). Heartbeat message transmission instructions 708 may transmit heartbeat messages to a firmware of computing device 600. For example, referring to FIG. 2, agent application 110 may transmit heartbeat message 224 to firmware 108 based on the heartbeat period.

The use of "comprising", "including" or "having" are synonymous and variations thereof herein are meant to be inclusive or open-ended and do not exclude additional unrecited elements or method steps.

What is claimed is:

1. A computing device comprising:
   a processor;
   a first storage device; and
   a second storage device storing instructions of a firmware, wherein the firmware is executable on the processor to:
   install an agent application into the first storage device,
   activate the agent application subsequent to installing the agent application into the first storage device, and
   in response to receiving a manifest file, instruct the agent application to monitor a program in the computing device based on the manifest file, wherein the manifest file specifies an expected state of the program in the computing device as being active, wherein the expected state of the program in the computing device specified by the manifest file is useable by the agent application, and wherein the agent application is executable to observe a state of each item referred to in the manifest file, and compare the observed state of each item referred to in the manifest file to a corresponding expected state of each item referred to in the manifest file.

2. The computing device of claim 1, wherein the firmware is executable on the processor to:

instruct the agent application to further monitor a registry entry associated with the computing device based on the manifest file.

3. The computing device of claim 1, wherein each of the first storage device and the second storage device comprises a non-volatile memory.

4. The computing device of claim 1, wherein the firmware is executable on the processor to:
install the agent application during a boot up operation of the computing device.

5. The computing device of claim 1, wherein the manifest file is stored in the second storage device.

6. The computing device of claim 1, wherein the firmware of the computing device is executable on the processor to:
send configuration data to the agent application to activate the agent application, wherein the configuration data specifies a heartbeat period; and
receive a heartbeat message from the agent application according to the heartbeat period.

7. The computing device of claim 6, wherein the firmware of the computing device is executable on the processor to:
receive an activation command instructing the firmware of the computing device to activate the agent application, wherein the activation command comprises the heartbeat period; and
instruct the agent application to monitor the program in the computing device based on the manifest file in response to receiving the activation command.

8. A non-transitory computer-readable storage medium storing instructions that when executed cause a computing device to:
install, with a firmware of the computing device, an agent application into a first storage device of the computing device;
in response to receiving a request from the agent application, transmit an authorization value to the agent application to establish a secured protocol;
in response to receiving a manifest file, instruct the agent application to monitor the computing device based on the manifest file;
receive a heartbeat message from the agent application via the secured protocol, wherein the heartbeat message indicates a presence of the agent application; and
in response to a failure to receive a heartbeat message upon an expiration of a heartbeat period, change, by the firmware of the computing device, a state of the computing device, wherein a transmission of heartbeat messages is stopped by the agent application responsive to the agent application being unable to remediate a non-compliance event in the computing device.

9. The non-transitory computer-readable storage medium of claim 8, wherein the instructions when executed further cause the computing device to:
change the state of the computing device by performing any or a combination of:
setting the computing device to a hibernation mode,
turning off the computing device,
suspending access to the computing device, or
performing an operating system recovery operation.

10. The non-transitory computer-readable storage medium of claim 8, wherein the agent application is to monitor, based on the manifest file, a registry entry associated with the computing device or a state of a firewall.

11. The non-transitory computer-readable storage medium of claim 8, wherein the instructions when executed further cause the computing device to:
generate a transport key based on the authorization value, wherein the heartbeat message received from the agent application via the secured protocol is encrypted by the transport key.

12. The non-transitory computer-readable storage medium of claim 8, wherein the instructions when executed further cause the computing device to:
send configuration data from the firmware of the computing device to the agent application to activate the agent application, wherein the configuration data specifies the heartbeat period.

13. A non-transitory computer-readable storage medium storing instructions that when executed cause a computing device to:
configure an agent application based on an activation message from a firmware of the computing device, wherein the agent application is installed from the firmware of the computing device, and wherein the activation message comprises a configuration setting for heartbeat messages;
establish a secured protocol with the firmware of the computing device;
in response to receiving a notification message from the firmware of the computing device, monitor the computing device based on a manifest file;
in response to detecting a non-compliance event in the computing device based on the manifest file, transmit a non-compliance message to an operating system of the computing device;
send, from the agent application, a heartbeat message to the firmware of the computing device via the secured protocol according to the configuration setting for the heartbeat messages; and
in response to being unable to remediate the non-compliance event in the computing device, stop sending heartbeat messages from the agent application to the firmware of the computing device.

14. The non-transitory computer-readable storage medium of claim 13, wherein the instructions when executed further cause the computing device to:
in response to detecting the non-compliance event in the computing device based on the manifest file, remediate the non-compliance event in the computing device based on the manifest file.

15. The non-transitory computer-readable storage medium of claim 14, wherein the instructions when executed further cause the computing device to:
in response to detecting a remediation of the non-compliance event in the computing device, transmit a status update message to the operating system of the computing device.

16. The non-transitory computer-readable storage medium of claim 13, wherein the heartbeat message is to indicate a presence of the agent application.

17. The non-transitory computer-readable storage medium of claim 13, wherein the secured protocol comprises a transport key, and wherein the heartbeat message is an encrypted heartbeat message encrypted based on the transport key.

18. The non-transitory computer-readable storage medium of claim 13, wherein the manifest file specifies an expected state of a program in the computing device as being active, wherein the expected state of the program in the computing device specified by the manifest file is useable by the agent application, and wherein the instructions when executed further cause the computing device to:

monitor, by the agent application, the computing device by observing a state of each item in the manifest file and comparing the observed state of each item in the manifest file to a corresponding expected state of each item in the manifest file.

19. The non-transitory computer-readable storage medium of claim 13, wherein the configuration setting for the heartbeat messages comprises a heartbeat period for the heartbeat messages.

\* \* \* \* \*